United States Patent [19]
Thompson

[11] Patent Number: 5,243,425
[45] Date of Patent: Sep. 7, 1993

[54] SYNCHRONIZATION OF VERTICAL PHASE OF THE VIDEO SIGNALS IN A VIDEO SYSTEM

[75] Inventor: Edwin S. Thompson, Loxahatchee, Fla.

[73] Assignee: Sensormatic Electronics Corporation, Deerfield Beach, Fla.

[21] Appl. No.: 793,814

[22] Filed: Nov. 18, 1991

[51] Int. Cl.5 .............................................. H04N 5/04
[52] U.S. Cl. .................................... 358/148; 358/149; 358/181
[58] Field of Search ............... 358/148, 149, 150, 151, 358/181, 158, 19

[56] References Cited

U.S. PATENT DOCUMENTS

| | | | |
|---|---|---|---|
| 3,424,866 | 1/1969 | Hathaway | 358/149 |
| 3,525,808 | 8/1970 | Brown | 358/149 |
| 4,333,103 | 6/1982 | Koiwa | 358/149 |
| 4,599,650 | 7/1986 | Wilkinson | 358/149 |
| 4,698,678 | 10/1987 | Collins | 358/149 |

Primary Examiner—James J. Groody
Assistant Examiner—Sherrie Hsia
Attorney, Agent, or Firm—Robin, Blecker, Daley & Driscoll

[57] ABSTRACT

A video system in which synchronization of the vertical phase components of a plurality of video signals is carried out by a plurality of reference signals having substantially the same frequency and substantially a fixed relative phase relationship. Each vertical synchronization signal is locked to one of the reference signals at a phase associated with the measured phase difference between the vertical synchronization signal and a selected one of the reference signals. In this way, all the vertical synchronization signals are brought into phase with one another.

17 Claims, 6 Drawing Sheets

SYNCHRONIZATION OF VERTICAL PHASE OF THE VIDEO SIGNALS IN A VIDEO SYSTEM

FIELD OF THE INVENTION

This invention relates to video systems using a plurality of video signals and, in particular, to methods, apparatus and systems for synchronizing such plurality of video signals.

BACKGROUND OF THE INVENTION

Video surveillance systems having multiple video cameras often comprise switching circuitry for selectively routing the video signals from the video cameras to a single viewing monitor. During this routing, if the selected video signals are not synchronized with respect to their vertical phase components (i.e., the components which initiate or start the video signals across the viewing monitor), significant distortion occurs. To avoid this, various procedures have been used to provide the needed vertical phase synchronization.

One form of vertical phase synchronization presently employed utilizes a dedicated reference signal to phase synchronize the vertical phase components of the various video signals. This reference signal is provided in common to the synchronization circuits which generate the synchronization signals for the video cameras developing the video signals. In this way, the vertical phase components of all the video signals are synchronized and little or no distortion occurs on the monitor when changing over from one video signal to another. However, this form of vertical phase synchronization is costly and labor intensive, since it requires the installation of a separate wire or a coaxial cable for carrying the dedicated reference signal to the synchronization circuits located at the video cameras.

A second form of vertical phase synchronization, known as linelock, utilizes the AC power line as a reference signal for the video camera synchronization circuits. Since the AC power line is usually already available for the purpose of general power distribution, no separate lines have to be installed and installation costs are thus reduced.

However, the AC power available at various points in a location is not necessarily at the same phase. For example, in a conventionally used three phase AC power distribution system, the phase of the AC power at any given location might be any one of the three different phases. Thus, in linelock systems, additional adjustments must still be made to compensate for the various phases of the AC power.

These adjustments are typically made at the video camera locations. Specifically, the synchronization circuits of the cameras must be manually adjusted to compensate for the phase differences of their respective AC power. This then causes the video signals of the cameras to become synchronized with respect to their vertical phase components.

As can be appreciated, having to adjust each synchronization circuit is labor intensive and costly. Accordingly, in many linelock systems, this adjustment is often neglected and the video signals are never vertically phase synchronized, resulting in distortion at the time of switching.

It is an object of the present invention to provide an improved synchronization method and apparatus for a video system.

It is also an object of the present invention to provide an improved video surveillance system wherein the vertical phase components of the video signals of the video cameras of the system can be remotely adjusted.

It is still a further object of the present invention to provide an improved video surveillance system which automatically synchronizes the vertical phase components of the video signals formed by the video cameras of the system.

SUMMARY OF THE INVENTION

In accordance with the principles of the present invention, the above and other objectives are realized in a system and method in which a plurality of reference signals of substantially the same frequency and having substantially a constant or fixed relative phase relationship are used to develop vertical synchronization signals for synchronizing the vertical phase components of a plurality of video signals. Each vertical synchronization signal is generated by a synchronizing and phase adjusting circuit which is responsive to one of the reference signals and which adjusts its vertical synchronization signal relative to such reference signal. Each vertical synchronization signal is further used as a synchronization signal for one of the video signals.

Means is provided for determining or measuring the phase difference between the vertical phase component of each video signal and a selected one of the reference signals or a signal having substantially the same frequency and at a fixed phase relationship relative to one of these references signals. Each measured or determined phase difference is then used by the synchronizing and phrase adjusting circuit associated with the corresponding video signal to adjust the phase between the reference signal associated with the circuit and the vertical synchronization signal generated by the circuit. In this way, the vertical synchronization signals of the synchronizing and phase adjusting circuits are brought into phase, thereby also bringing into phase the vertical phase components of the video signals.

In the embodiment of the invention to be described hereinafter, each synchronizing and phase adjusting circuit initially adjusts its vertical synchronization signal based on a preselected or given phase relative to the supplied reference signal. Thereafter, the phase is further adjusted based on the determined or measured phase difference. Also, in the disclosed embodiment, microcomputers are used to control the synchronizing and phase adjusting circuits and to make the phase difference measurements.

DESCRIPTION OF THE DRAWINGS

The above and other features and aspects of the present invention will become more apparent upon reading the following detailed description in conjunction with the accompanying drawings, in which.

DETAILED DESCRIPTION OF THE INVENTION

Figure 1:
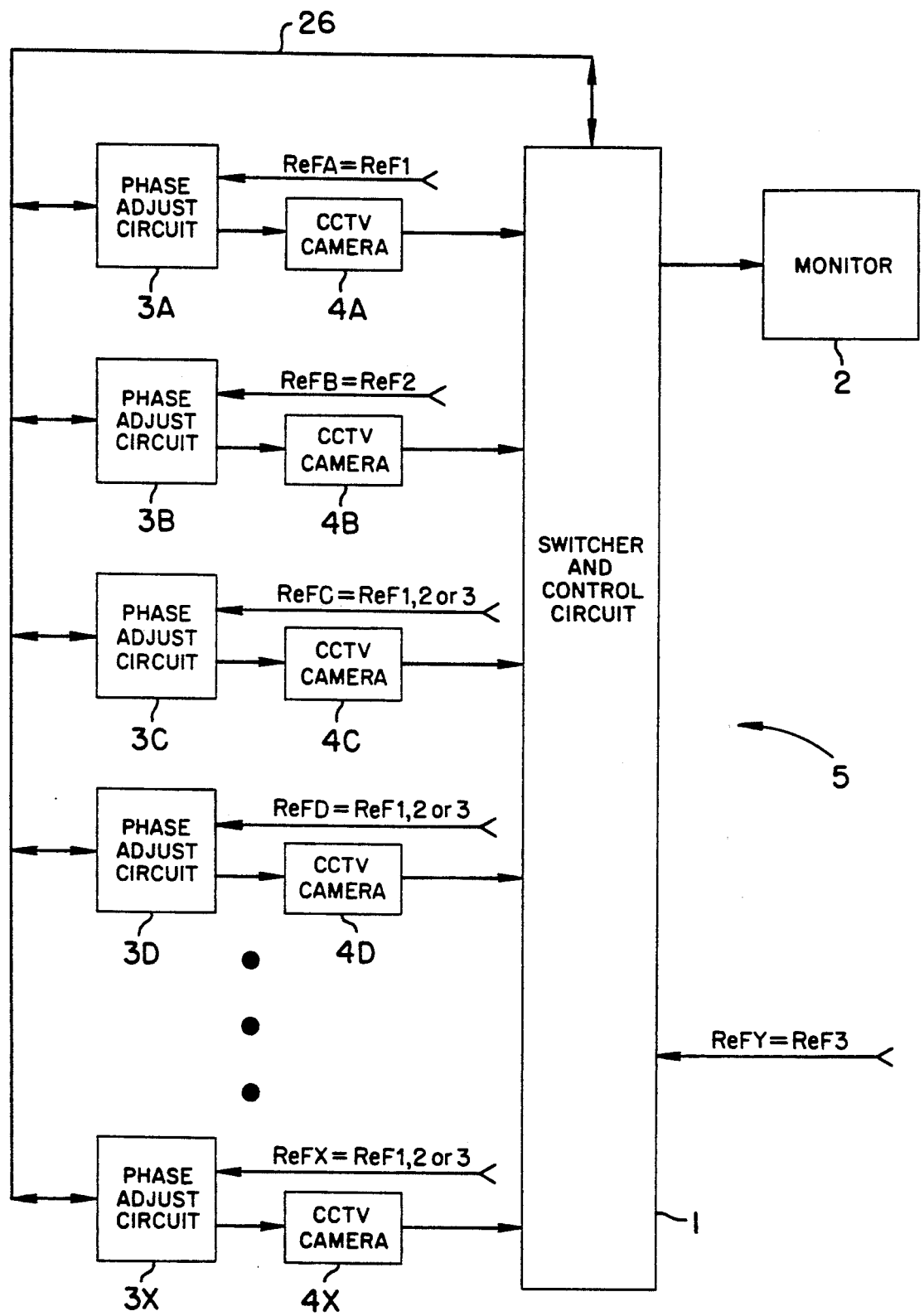
FIG. 1 shows a video system employing a synchronization system and method in accordance with the principles of the present invention.

FIG. 1 shows a video system 5 employing a synchronization system and method in accordance with the principles of the present invention. As shown, a plurality of CCTV cameras 4A-4X generate video signals which are selectively routed by a switcher and control circuit (SCC) 1 to a display monitor 2. Each CCTV camera 4A-4X is supplied a vertical synchronization signal from a respective synchronizing and phase adjusting circuit 3A-3X. Each CCTV camera uses the supplied vertical synchronization signal to establish the vertical phase component of its respective video signal.

The synchronizing and phase adjusting circuits 3A-3X and the SCC 1 are each responsive to one of a plurality of reference signals ReFA-ReFY. The reference signals ReFA-ReFY are at substantially the same constant frequency and have a substantially constant or fixed relative phase relationship. In the present case, the reference signals ReFA-ReFX are assumed to be developed from the AC power line serving the location where the CCTV cameras are situated. As a result, they are further assumed to each be formed by one of the three phase reference signals ReF1-ReF3 common to a conventional three phase AC power distribution system.

The reference signal ReFY is also formed from one of the reference signals ReF1-ReF3 and, specifically, in the present case, from the reference signal ReF3. However, as will be discussed below, the signal ReFY might also be formed from a video signal whose vertical phase component is at the same frequency as that of the reference signals ReFA-ReFY and is also locked in phase or linelocked to one of these reference signals.

As can be appreciated, the circuits 3A-3X which receive reference signals of different phase will generate corresponding vertical synchronization signals also of different phase. Accordingly, the corresponding CCTV cameras will produce video signals whose vertical phase components are out-of-phase. This, in turn, will result in distortion of the video signal displayed on the monitor 2 when the SSC 1 switches from one video signal to another.

In accordance with the principles of the present invention, this distortion of the displayed video signal is avoided by appropriate configuration of the SSC 1 and circuits 3A-3X. In particular, these elements are configured so as to cause the vertical synchronization signals to be adjusted relative to their respective reference signals such that the synchronization signals all become in-phase. This causes the vertical phase components of all the video signals also to be in-phase. As a result, when the SCC 1 now switches from one video signal to another, no distortion of the displayed signal occurs. The operation and configuration of the circuits 3A-3X and the SCC 1 to achieve this is discussed in more detail below.

Figure 2:
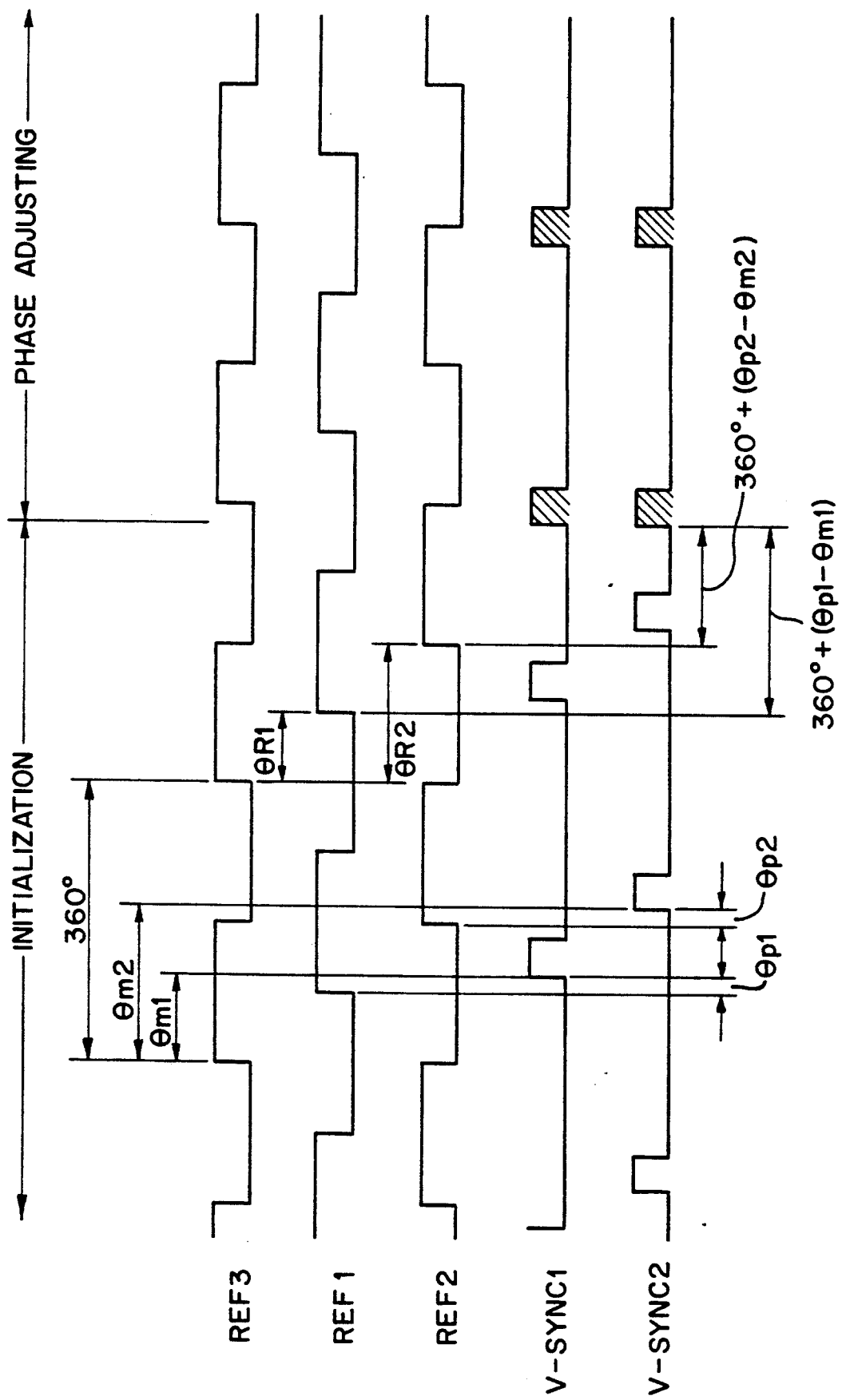
FIG. 2 is a timing diagram illustrating the timing of the synchronization system of FIG. 1.

FIG. 2 is a timing diagram illustrating the phase relationship between the reference signals ReF1, ReF2 and ReF3. As shown, the reference signal ReF3 precedes the reference signal ReF1 by a fixed phase $\Theta R1$ and precedes the reference signal ReF2 by a fixed phase $\Theta R2$. In the present illustrative case, to simplify the explanation of the invention, it is assumed that the reference signal ReF1 feeds the circuit 3A, the reference signal ReF2 feeds the second circuit 3B and the reference signal ReF3 feeds the SCC 1. The remaining circuits 3C-3X, in turn, are fed by one of the three reference signals ReF1-ReF3.

During initialization of the video system 5, each of the circuits 3A-3X, in response to its supplied reference signal, generates its vertical synchronization signal at a given phase $\Theta p$ relative to the supplied reference signal. The video signal developed by the associated CCTV camera will thus have a vertical phase component which is also at the phase $\Theta p$ relative to the supplied reference. The phase angles $\Theta p$ for the circuits 3A-3X may initially be the same value preset during the manufacturing of the circuits, but after subsequent power-ups and power-downs of the system 1, these angles will likely be different.

Referring more particularly to FIG. 2, it shows the vertical synchronization signal V-SYNC1 of the circuit 3A developed during initialization. In the figure, the presence of the vertical synchronization signal is indicated by the V-SYNC1 signal going high. As shown, V-SYNC1 begins at the predetermined phase angle $\Theta p1$ after the rising edge of its corresponding reference signal ReF1 supplied to the circuit 3A. Also shown is the synchronization signal V-SYNC2 from the circuit 3B. Again, V-SYNC2 begins at the predetermined phase angle $\Theta p2$ after the rising edge of its associated reference signal ReF2 supplied to the circuit 3B.

After the phase adjusting circuits 3A-3X make this initial phase adjustment, the SCC 1 undertakes to measure or determine the phase difference $\Theta$ between the reference signal supplied to the SCC 1 (shown, as Ref3, in FIG. 1), and the vertical phase component of each of the video signals of the video cameras 4A-4X. The SCC 1 then generates for each measured phase difference $\Theta_m$ a corresponding signal and transmits this signal by way of a serial communications line 26 to the associated one of the circuits 3A-3X.

After each circuit 3A-3X receives its respective phase difference signal, each circuit now adjusts the phase of its vertical synchronization signal so that instead of the signal being at the phase angle $\Theta p$ relative to its reference signal, it is now at a relative phase of $(\Theta p - \Theta_m)$, if $(\Theta p - \Theta_m)$ is positive, or $360° + (\Theta p - \Theta_m)$, if $(\Theta p - \Theta_m)$ is negative. This results in bringing all the synchronization signals into phase.

FIG. 2 shows this further phase adjustment for the circuits 3A and 3B and their associated V-SYNC1 and V-SYNC2. As can be seen, after initialization the signals V-SYNC1 and V-SYNC2 are at first and second measured phase angles $\Theta 1$ and $\Theta 2$ relative to the reference signal ReF3. During phase adjustment, these signals are then adjusted to be at phases as above indicated relative to their respective reference signals ReF1 and ReF2. This results in the vertical synchronization signals V-SYNC1 and V-SYNC2 being brought into phase with one another as shown by the shaded pulses on the figure. Since the vertical phase components of the video signals from the video cameras 4A and 4B are generated in response to the in-phase V-SYNC1 and V-SYNC2 signals, they also will be generated in-phase or synchronously in time.

A similar situation occurs for the vertical synchronization signals of the other circuits 3C-3X and the vertical phase components of their respective video signals.

These signals will thus all be generated in-phase as above-described.

Figure 3:
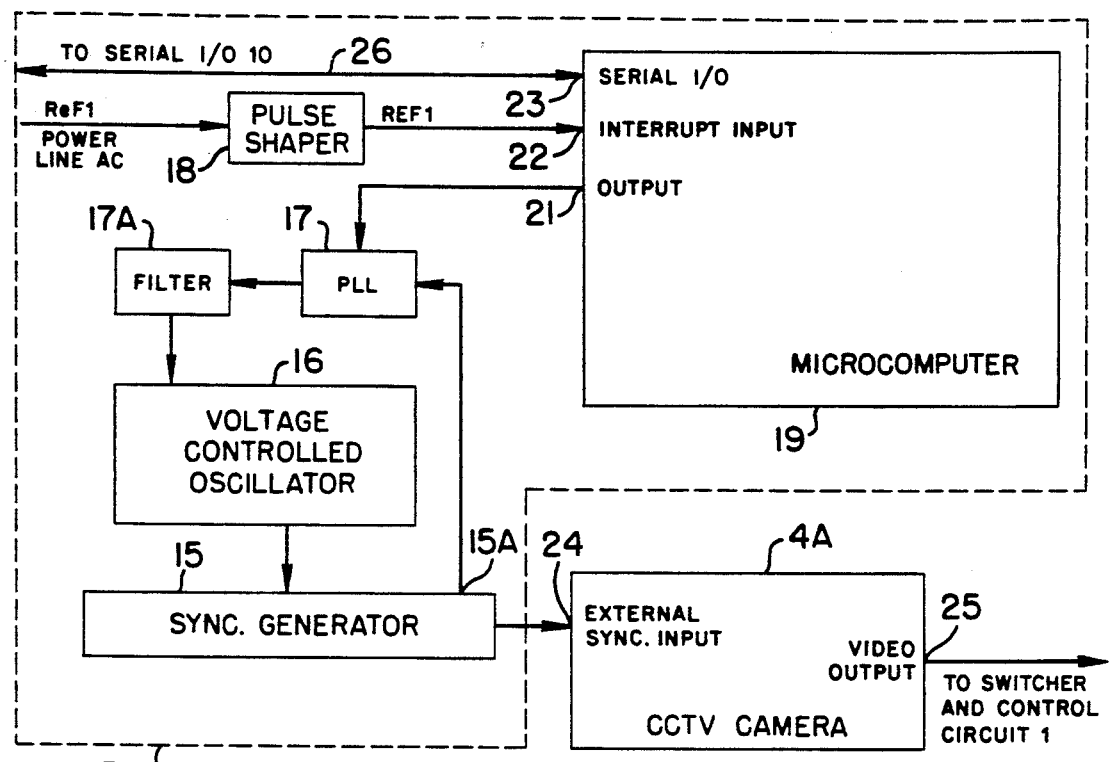
FIG. 3 shows a synchronizing and phase adjusting circuit of the synchronization system of FIG. 1 in greater detail.

FIG. 3 shows in greater detail a representative form of the circuit 3A. The circuits 3B–3X are of similar form and operate similarly to the circuit 3A and thus have not been specifically illustrated.

As shown, the circuit 3A comprises a pulse shaper circuit 18 for shaping the associated AC reference signal ReF1 before the signal is supplied to an interrupt input 22 of a microcomputer 19. The microcomputer 19 has a serial I/O port 23 for receiving signals from the SCC 1 over the path 26. A phase reference output 21 from the microcomputer 19 is connected to a phase-locked-loop (PLL) 17. The PLL 17 also receives a vertical synchronization signal output 15A from a sync. generator 15. The PLL develops an output error signal corresponding to the phase difference between the outputs 21 and 15A and delivers the error signal to a filter 17A.

The filtered output from the filter 17A is coupled as an analog voltage level to the input of a voltage controlled oscillator (VCO) 16. Responsive to this voltage level, the VCO 16 generates a control signal which is supplied to the clock input of the sync. generator 15. The sync. generator 15, in turn, generates the vertical synchronization signal V-SYNC1 which, as above-indicated, is supplied to the PLL 17.

A composite synch signal containing V-SYNC1 timing is applied by the sync. generator 15 to the External Sync. Input 24 of the camera 4A. In response to this signal, the camera 4A generates a video signal whose vertical phase component is synchronized with or begins at the same time as the vertical synchronization signal V-SYNC1.

Figure 4:
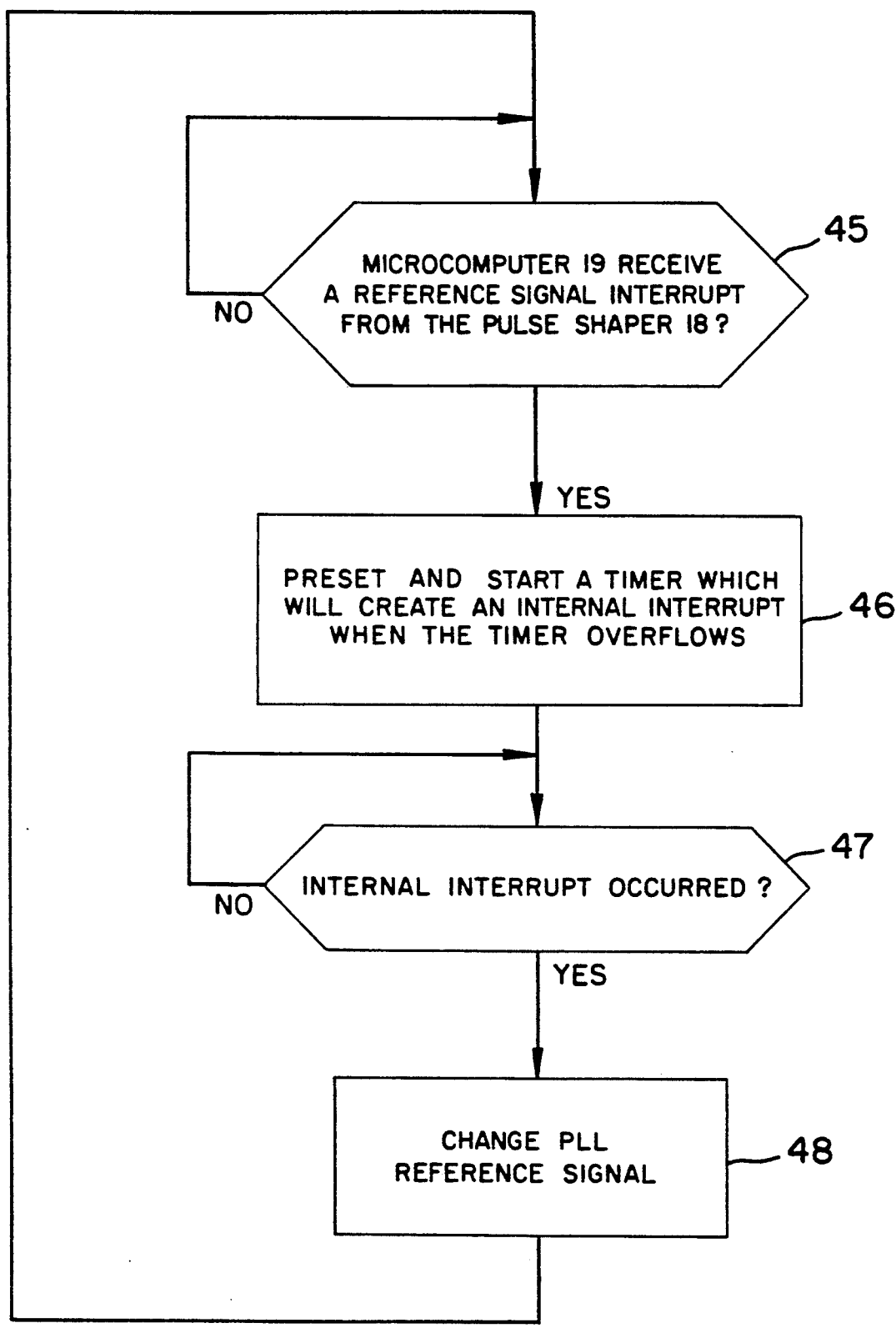
FIG. 4 is a flowchart illustrating the operation of the synchronizing and phase adjusting circuit of FIG. 3.
Figure 5:
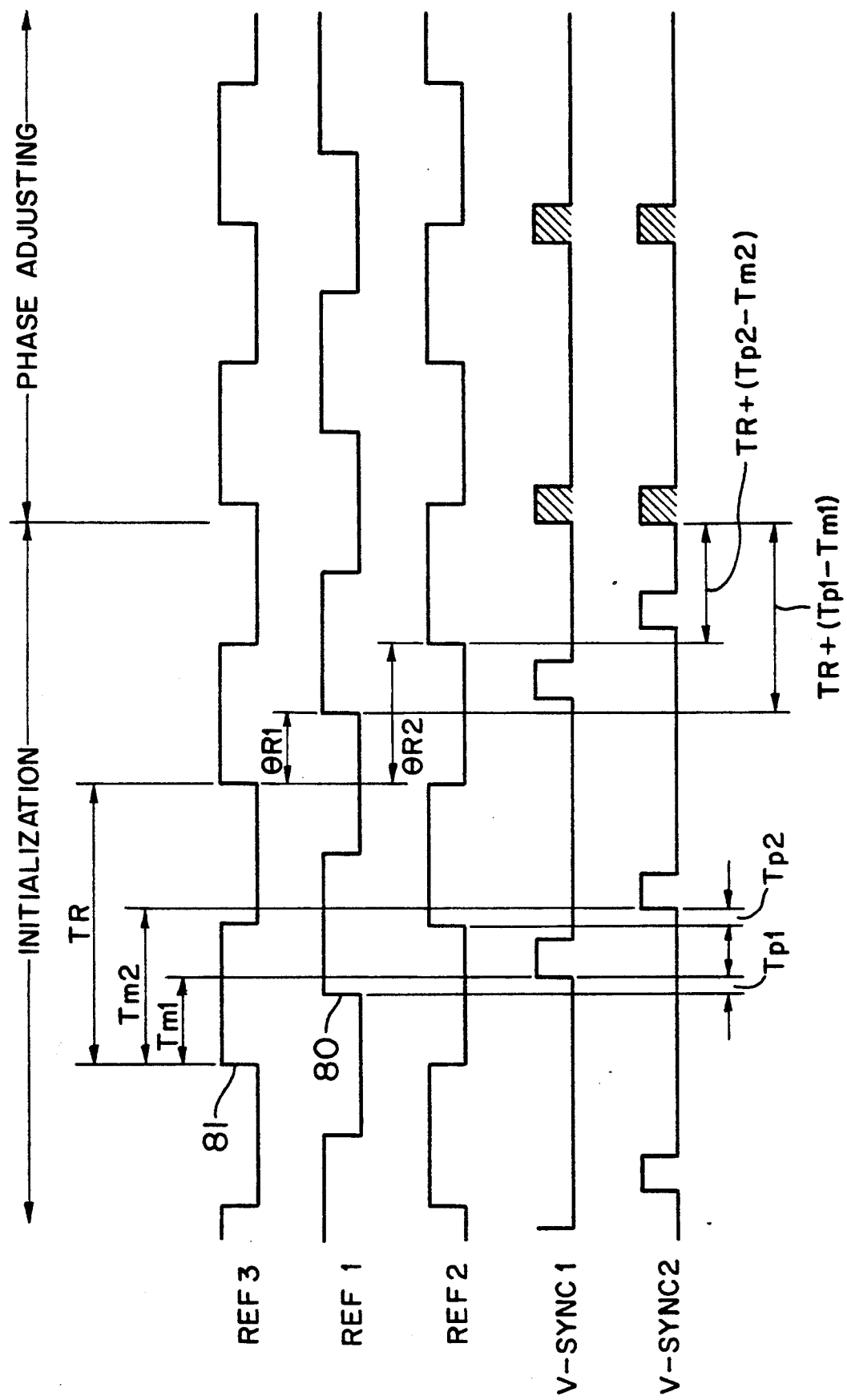
FIG. 5 is a further timing diagram illustrating the timing of the synchronization system of FIG. 1.

The operation of the circuit 3A during initialization can be understood by referring to the flow chart of FIG. 4 and the timing diagram of FIG. 5. The timing diagram of FIG. 5 is the same as the timing diagram of FIG. 2, except that the various phases are now shown as corresponding time delays.

Referring to the flow chart of FIG. 4, in STEP 45 the microcomputer 19 waits until the reference signal Ref1 undergoes a low to high transition 80 at which time an interrupt is generated and the microcomputer proceeds to STEP 46.

In STEP 46, the microcomputer 19 presets an internal timer to a predetermined value so that the timer will overflow and generate an internal interrupt at a predetermined time $T_p1$ after the low to high transition 80 of ReF1. The predetermined value $T_p1$ corresponds to the phase $\Theta p1$ in FIG. 2.

In STEP 47, the microcomputer waits for the internal interrupt to occur. When the internal interrupt occurs the microcomputer proceeds to step 48.

In STEP 48, the microcomputer 19 changes the state of the phase reference signal at 21.

Steps 45–48 are continuously repeated. As a result, after a lock-in time period of a few seconds, the vertical synchronization signal V-SYNC1, is locked-in at a predetermined delay time period $T_p1$ relative to the reference signal ReF1.

The parameters of the filter 17A and the VCO 16 can be adjusted so as to obtain a desired lock-in time period. Accordingly, the generated video signal at the camera 4A will be having a stable vertical phase component.

In the above configuration of the circuit 3A, the microcomputer 19 provides a phase reference signal at the output 21 to the PLL 17. However, it is also possible to provide an binary control signal at the output 21 which can be converted into an analog signal for driving the VCO 16. Still further, the microcomputer 19 itself can be adapted to provide an adjustable high speed output at the port 21 to directly drive the sync. generator.

As above-indicated, each of the circuits 3B–3X is of similar configuration and operates similarly to the circuit 3A. Thus, during initialization, each circuit generates its vertical synchronization signal as discussed above for circuit 3A. FIG. 5 shows the V-SYNC2 signal of the circuit 3B as a further example.

As also above-indicated, after initialization, the SCC 1 measures the phase difference between the vertical phase component of each video signal and the selected reference signal ReF3. The construction and the operation of the SCC 1 can be understood by reference to FIG. 6, the timing chart of FIG. 5 and the flow chart of FIG. 7.

Figure 6:
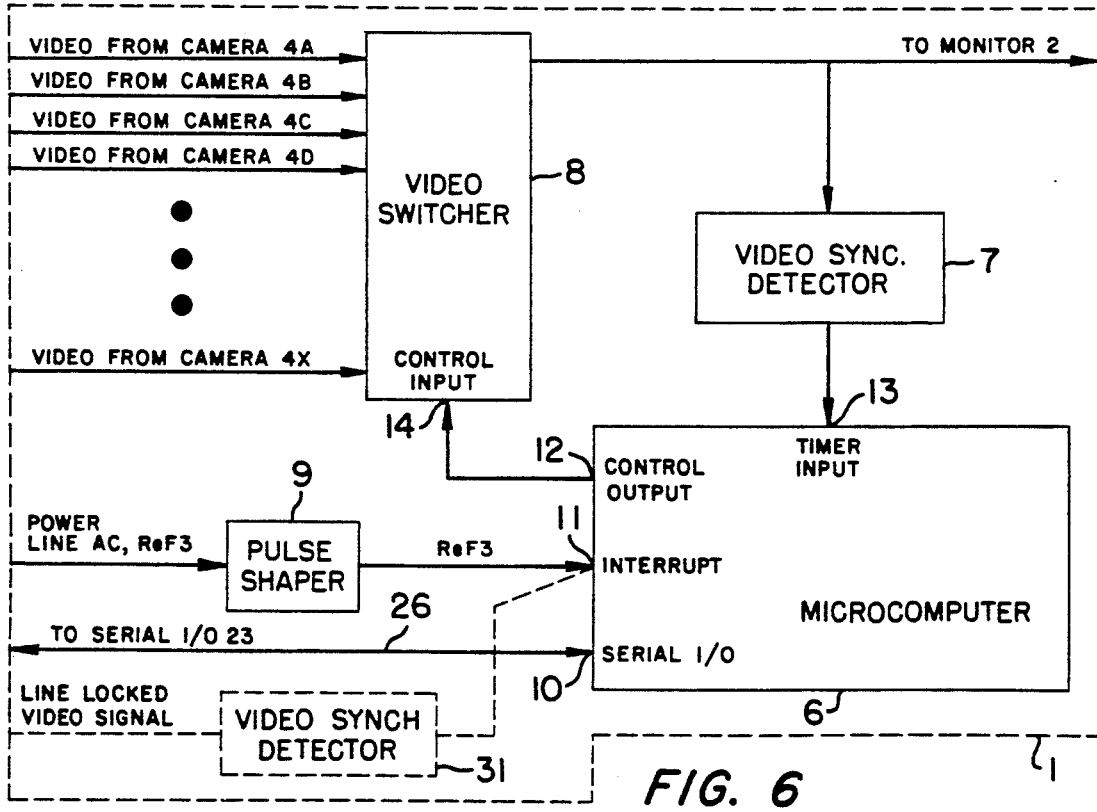
FIG. 6 shows a switcher and the control circuit for the synchronization system of FIG. 1 in greater detail.

As shown in FIG. 6, SCC 1 comprises a microcomputer 6 having a control output 12 which drives a control input 14 of a video switcher 8. Based upon the state of the control input, the video switcher 8 selectively routes the received video signals from the video cameras 4A–4X to the monitor 2 where the video signals are displayed. Each video signal selected for viewing is also provided to a video sync. detector 7 which detects the vertical phase component of the signal. The detector 7 addresses a timer input 13 on the microcomputer 6.

The AC power line ReF3 is coupled through a pulse shaper 9 and applied to an interrupt 11 of the microcomputer 6. A serial I/O port 10 is provided for serially transmitting signals over the serial communications line 26 to the remotely located circuits 3A–3X.

Figure 7:
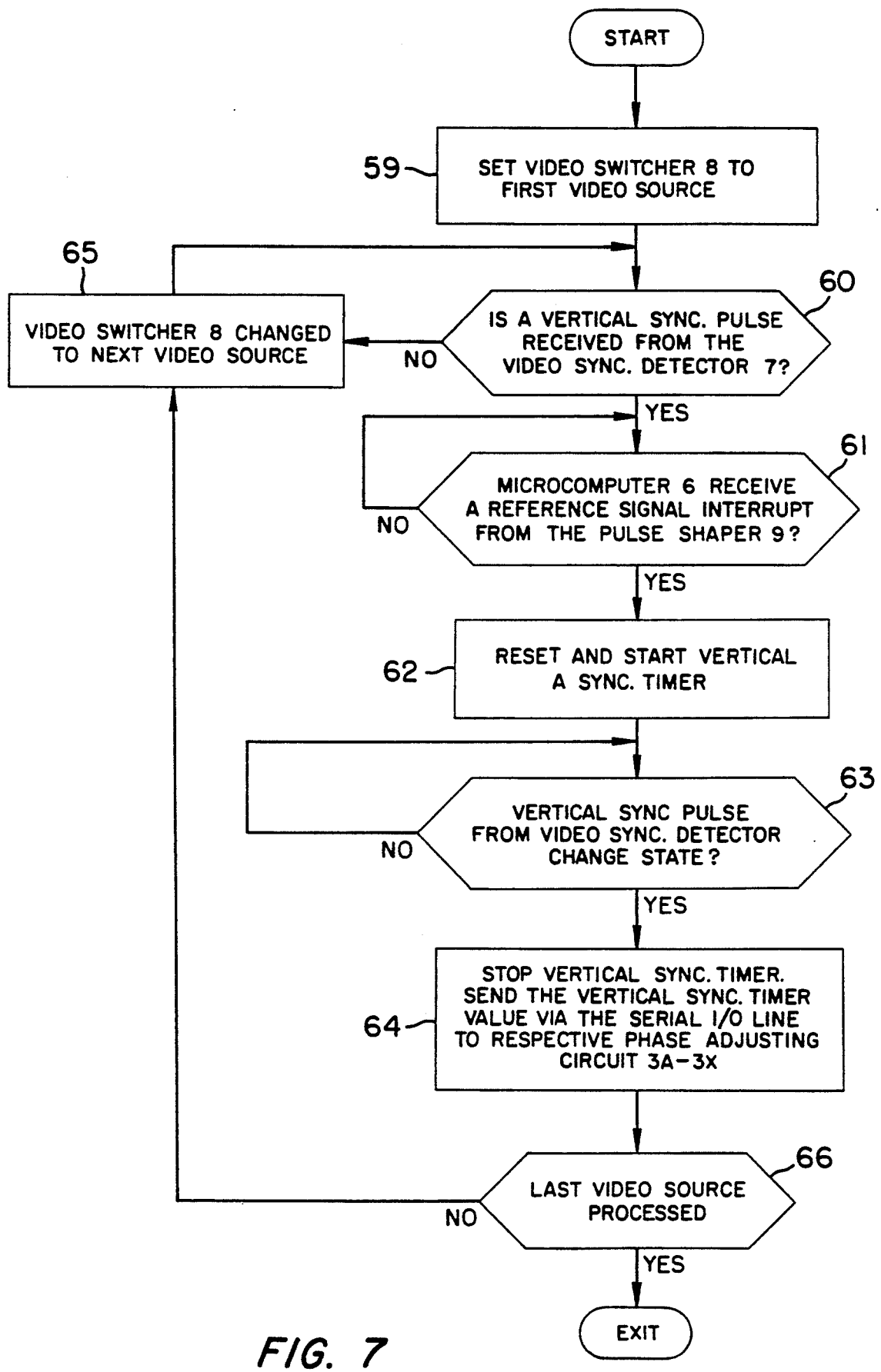
FIG. 7 is a flowchart illustrating the operation of the switcher and control circuit of FIG. 6.

The phase difference measuring operation of the SCC 1 is set forth in the measuring routine flow chart of FIG. 7. Referring to FIG. 7, in STEP 59, the microcomputer 6 sets the control input 14 of the video switcher 8 to a value which causes the video switcher 8 to route the video signal received from the first video camera 4A to the monitor 2 and to the video sync. detector 7.

In STEP 60, the microcomputer 6 waits a predetermined time for the video sync. detector 7 to detect the vertical phase component of the selected video signal. If the vertical phase component is not detected in the predetermined time the microcomputer proceeds to STEP 65 where the video switcher is set to route the next video signal to the monitor 2 and to the video sync. detector 7 and then STEP 60 is repeated. If a vertical phase component is detected by the vertical sync. detector, the microcomputer proceeds to STEP 61.

In STEP 61, the microcomputer 6 waits until the reference signal ReF3 undergoes a low to high transition 81 at which time an interrupt is generated and the microcomputer 6 proceeds to STEP 62.

In STEP 62, the microcomputer 6 resets and starts an internal timer running.

In STEP 63, the microcomputer 6 waits until video sync. detector 7 again detects the vertical phase component of the video signal being monitored. Upon such detection, the detector 7 output changes state causing the internal timer of the microcomputer 6 to stop at a corresponding measured time $T_m$ and an interrupt to be generated.

In FIG. 5, the time delays $T_m1$ and $T_m2$ are the values of the internal timer when the vertical phase components of the video signals of the cameras 4A and 4B, respectively, are detected. The measured time delays $T_m1$ and $T_m2$ thus correspond to the phases $\Theta_m1$ and $\Theta_m2$ shown in FIG. 2.

In STEP 64, the microcomputer 6 generates a signal corresponding to the value of the internal timer and serially transmits the signal over the serial communications line 26 to the appropriate phase adjusting circuit 3A-3X.

In STEP 66, the microcomputer determines whether the video signal from the last camera 4X has been processed. If yes, then the microcomputer 6 exits its measuring routine. If no, the microcomputer proceeds to step 65 where the video switcher is set to route the next video signal to the monitor 2 and to the video sync. detector 7 and then STEP 60 is repeated.

In the measuring routine shown in FIG. 7, the measurement of the time period or delay $T_m$ between the reference signal ReF3 and each vertical phase component is only performed once. However, it is preferable that each measurement be taken a number of times and then an average be taken. This helps to prevent errors which might occur due to noise introduced during any single measurement.

When the SCC 1 exits its described measuring operation, signals corresponding to the time delays $T_m$ between the vertical phase component of each of the video signals and the reference signal ReF3, have been transmitted to the respective circuits 3A-3X.

Each circuit then uses the measured time delay $T_m$ to lock its vertical synchronization signal to the associated reference signal. During this operation, each circuit again carries out the routine of steps 45-50 of FIG. 4 with some modification.

In particular, STEPS 45 and 47-50 are performed as previously described for the initialization operation. In the case of STEP 46, however, instead of using the predetermined delay $T_p$ for presetting the internal timer of the computer 19 a value based upon the measured time delay $T_m$ received at the respective circuit 3A-3X is used. In particular, the value is set at $(T_p-T_m)$, if $T_p-T_m$ is positive, and at $TR+(T_p-T_m)$, if $(T_p-T_m)$ is negative.

By way of example, when the circuit 3A performs STEP 46, the internal timer is set to a value such that the internal timer will overflow and cause an interrupt after a time period $TR+(T_p1-T_m1)$, where $T_m1$ is the measured time delay received by the circuit 3A and TR is the period of the reference signal ReF3. Similarly, when the second phase adjusting circuit 3B performs STEP 46, the internal timer is set to a value such that the internal timer will overflow and cause an interrupt after a time period $TR+(T_p2-T_m2)$, where $T_m2$ is the measured time delay received at the circuit 3B.

As a result of this phase adjusting operation, after a lock-in period, each vertical synchronization signal will become locked-in to its respective reference signal at the appropriate time delay. This causes all the synchronization signals to be in phase with each other, as above-described and as shown by the shaded pulses of the V-SYNC1 and V-SYNC2 signals in FIG. 5.

While the above description has illustrated the invention in terms of reference signals derived from the three phases of an AC power source, it can be appreciated that the invention can be effected using any plurality of reference signals provided all the reference signals have substantially the same frequency and a fixed relative phase relationship. Further, while in the above description, the SCC 1 received the reference signal ReF3, it could have been operated with any of the other reference signals as well.

Additionally, as above-noted, the reference signal for the SCC1 can be developed from a video camera signal whose vertical phase component is at substantially the same frequency and at a preset phase, i.e., linelocked, to one of the reference signals. This modification is shown in FIG. 6 in dotted line by the additional vertical synch detector 31 which is responsive to such a linelocked video camera signal and extracts its vertical synch timing for application to the interrupt port 11 of microcomputer 6. This thus provides the reference signal for the microcomputer 6, replacing the pulse shaper and reference signal ReF3.

In the above description, the operation of the switcher 8 was assumed to occur automatically based upon microcomputer instruction. However, the switcher could also have been manually operated with the operator being prompted by the microcomputer 6 when switching is desired.

In all cases it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A vertical phase adjusting video system for vertically synchronizing a plurality of video signals utilizing a plurality of reference signals having substantially the same frequency and a substantially fixed relative phase relationship therebetween; the system comprising:

a plurality of video means each responsive to a reference signal and each generating a video signal having a vertical phase component, each video means including synchronizing and phase adjusting means for generating a vertical synchronization signal to be used for setting the vertical phase component of the video signal produced by the video means, each said synchronizing and phase adjusting means adjusting the phase of the vertical synchronization signal generated by the synchronizing and phase adjusting means relative to the associated reference signal to which its respective video means is responsive in accordance with a measured phase difference; and measuring means for measuring the difference in phase between the vertical phase component of each video signal and a selected one of said plurality of reference signals and for supplying the measured phase difference associated with each video signal to the video means producing the video signal.

2. A vertical phase adjusting video system in accordance with claim 1 wherein:

each synchronizing and phase adjusting means prior to adjusting its vertical synchronization signal in accordance with the associated measured phase difference adjusts its vertical synchronization signal such that it is at an associated given phase relative to the associated reference signal.

3. A vertical phase adjusting video system in accordance with claim 2 wherein:

each synchronizing and phase adjusting means adjusts the phase of its vertical synchronization signal in accordance with the associated measured phase difference by adjusting its vertical synchronization signal such that it is at an adjusted phase equal to a further phase difference determined by subtracting the associated measured phase difference from the associated given phase, if the further phase difference is positive, or is equal to 360° plus the further phase difference, if the further phase difference is negative.

4. A vertical phase adjusting video system in accordance with claim 2 wherein:
each of said video means comprises a video camera for generating said video signal of said video means, each said video camera being responsive to the vertical synchronization signal generated by the synchronizing and phase adjusting means of the associated video means.

5. A vertical phase adjusting video system in accordance with claim 4 wherein:
each said synchronizing and phase adjusting means comprises: a synchronization generator for generating the vertical synchronization signal of said synchronizing and phase adjusting means; presettable timer means for selectably setting a time period, said time period being set in response to the reference signal associated with said synchronization and phase adjusting means; means responsive to expiration of said time period for monitoring the vertical synchronization signal of said synchronizing and phase adjusting means and controlling the synchronization generator of said synchronizing and phase adjusting means to cause said monitored vertical synchronization signal to occur at the expiration of said time period.

6. A vertical phase adjusting video system in accordance with claim 5 wherein:
said time period is initially set to a value corresponding to the associated given phase and subsequently set to a value corresponding to the associated adjusted phase.

7. A vertical phase adjusting video system in accordance with claim 5 wherein:
said presettable timer means and said monitoring and controlling means of each synchronizing and phase adjusting means comprise a microcomputer controlling a phase locked loop.

8. A vertical phase adjusting video system in accordance with claim 7 wherein:
said measuring means comprises timer means for establishing the time duration between the occurrence of the vertical phase component of each of said video signals and the occurrence of said selected one of said plurality of reference signals.

9. A vertical phase adjusting video system in accordance with claim 8 wherein:
said timer means comprises a further microcomputer responsive to said selected one of said plurality of reference signals and selectively responsive to the vertical phase components of said video signals.

10. A vertical phase adjusting video system in accordance with claim 9 wherein:
said measuring means further comprises a video switcher means for selectively applying said video signals to said further microcomputer.

11. A vertical phase adjusting video system in accordance with claim 2 wherein:
said selected one of said reference signals is a signal derived from the vertical synchronization information of a video camera signal whose vertical phase component has been locked at a preset phase to one of said reference signals.

12. A vertical phase adjusting video system in accordance with claim 1 wherein:
said selected one of said reference signals is a signal derived from the vertical synchronization information of a video camera signal whose vertical phase component has been locked at a particular phase to one of said reference signals.

13. A method for vertically synchronizing a plurality of video signals utilizing a plurality of reference signals having substantially the same frequency and a substantially fixed relative phase relationship therebetween; the method comprising:
generating a plurality of video signals each having a vertical phase component and being associated with a reference signal;
measuring the difference in phase between the vertical phase component of each video signal and a selected one of said plurality of reference signals;
and generating vertical synchronization signals each to be used for setting the vertical phase component of one of the video signals, said step of generating vertical synchronization signals including adjusting the phase of each generated vertical synchronization signal relative to the reference signal and in accordance with a measured phase difference corresponding to the video signal whose vertical phase component is to be set using the generated vertical synchronization signal.

14. A method in accordance with claim 13 wherein:
prior to adjusting the phase of each generated vertical synchronization signal, providing an initial phase adjustment of each vertical synchronization signal such that it is at an associated given phase relative to the reference signal corresponding to the video signal whose vertical phase component is to be set using the generated vertical synchronization signal.

15. A method in accordance with claim 14 wherein:
the adjusting of the phase of each vertical synchronization signal is such that the vertical synchronization signal is at an adjusted phase equal to a further phase difference determined by subtracting the associated measured phase difference from the associated given phase, if the further phase difference is positive, or is equal to 360° plus the further phase difference, if the further phase difference is negative.

16. A method in accordance with claim 14 wherein:
said selected one of said reference signals is a signal derived from the vertical synchronization information of a video camera signal whose vertical phase component has been locked at a preset phase to one of said reference signals.

17. A method in accordance with claim 13 wherein:
said selected one of said reference signals is a signal derived from the vertical synchronization information of a video camera signal whose vertical phase component has been locked at a preset phase to one of said reference signals.

* * * * *